United States Patent [19]

Kaminstein et al.

[11] 3,976,580

[45] Aug. 24, 1976

[54] GELLED FIRE EXTINGUISHER FLUID COMPRISING POLYACRYLAMIDE AND BENTONITE

[76] Inventors: Bernard Kaminstein, 329 Franklin Place, Paramus, N.J. 07652; Wyman F. Uhl, 6 Kitchener Road, Sterling, Mass. 01564

[22] Filed: Nov. 7, 1975

[21] Appl. No.: 629,712

[52] U.S. Cl. .......... 252/2; 169/47; 252/316

[51] Int. Cl.[2] .......... A62D 1/00; B01J 13/00

[58] Field of Search .......... 252/2; 169/47

[56] References Cited

UNITED STATES PATENTS

| | | | |
|---|---|---|---|
| 3,229,769 | 1/1966 | Bashaw et al. | 169/45 |
| 3,354,084 | 11/1967 | Katzer | 252/2 |
| 3,684,707 | 8/1972 | Livingston | 252/2 |

*Primary Examiner*—Leland A. Sebastian
*Attorney, Agent, or Firm*—Lindenberg, Freilich, Wasserman, Rosen & Fernandez

[57] ABSTRACT

A fire extinguisher fluid comprising an aqueous gel containing as gelling agent a combination of polyacrylamide and bentonite, particularly a mixture of 0.5 parts polyacrylamide and 2.7 parts bentonite, per 100 parts of water, by weight. The gelling components are incorporated in water in the proper proportions, and a stream of the resulting aqueous gel is applied to a burning area, to form a wet cool blanket thereover and inhibit further burning.

30 Claims, No Drawings

GELLED FIRE EXTINGUISHER FLUID COMPRISING POLYACRYLAMIDE AND BENTONITE

BACKGROUND OF THE INVENTION

The present invention relates to fire extinguisher fluids and is particularly concerned with a novel fire extinguisher fluid which when applied to a heated or burning area forms a cool layer or blanket over such area, reducing the temperature and thereby inhibiting further combustion.

Two major methods of firefighting include stopping combustion and burning once it has begun, usually by smothering or depleting the supply of oxygen, and by maintaining a temperature in the vicinity of the fire which is below the combustion temperature of surrounding areas to those actually burning.

The second method noted above, that is substantial reduction in temperature, is most effective, and this is the method employed when water is poured onto a fire and surrounding structures. It can be visualized that if the water could be maintained in the form of a layer over the burning area, or held in position so it did not run off a burning area or structure, then a single wetting of the area would be much more effective, last longer and provide for a vastly larger area of coverage from a single nozzle, especially when considering a portable supply either by truck or can.

If water is to be thickened or gelled, the resulting gel must still be essentially water, and the thickener or gelling agent should be relatively inert to burning. Further, the aqueous gel should have the property of holding up or maintaining gel stability under elevated temperature conditions throughout the process of water evaporation which basically provides the cooling effect.

It is accordingly an object of the present invention to provide an effective cooling, particularly fire extinguisher fluid. A further object is the provision of an aqueous gel as fire extinguisher fluid, which is rapidly and readily formed and which when applied over a burning area effectively blankets the area to reduce the temperature thereof and of the surrounding areas, so as to reduce the temperature below the combustion temperature and inhibit further burning. A still further object is the provision of a specific aqueous gel for the above purposes, employing a combination of specific materials as gelling agent. A still further object is the provision of procedure for applying an aqueous gel of the above type to a heated or burning area or fire to cool and substantially reduce its temperature, to inhibit further combustion, or to extinguish the fire.

DESCRIPTION OF THE INVENTION

The above objects are achieved according to the invention and an effective cooling and fire extinguisher fluid is provided by gelling water or forming an aqueous gel by incorporating in water as gelling agent, the combination of a polyacrylamide and bentonite, particularly in certain proportions, as described in greater detail hereinafter.

Although bentonite, a naturally occurring water absorber and swelling agent has good gelling properties, it is difficult to efficiently mix bentonite with water, and of particular significance it requires in the neighborhood of at least about 16% solids to form a firm aqueous gel. Polyacrylamide is a known water gelling agent but also requires relatively large proportions of such material in fine powder form to produce an effective firm gel.

On the other hand, it has been found that a mixture of polyacrylamide and bentonite when added to water rapidly forms and provides a gel having properties of improved flow under pressure, better hold or maintenance on vertical surfaces under static conditions, requires a reduced amount of solids for gel formation and affords easy clean up of baked solids from the gel remaining following a fire and after water has evaporated, and further, the bentonite functions as an inexpensive diluent for the polyacrylamide. Hence, it has been found that by employment of a mixture of the polyacrylamide and bentonite, as gelling agent, relatively small portions of both of these components provide an excellent water gel which is rapidly formed and which when applied to a burning area provides a wet layer or blanket which maintains a cool surface adjacent to the high temperature or ignited areas.

Any commercially available polyacrylamide can be employed, such as the material marketed as XD1209 or Gelgard F, by Dow Chemical Co. The material preferably should be in the form of a powder, the finer the particle size the better the aqueous gel characteristic. Use of fine particle size polyacrylamide combines more rapidly with water to form a gel due to greater surface area exposure, and the resulting gel is more smooth and firm. In preferred practice the acrylamide powder is of particle such that at least 95 percent of the powder is not in excess of 70 microns in size, or at least 95 percent of the powder passes a U.S. Standard No. 200 sieve. Other equivalent polyacrylamide materials can be employed, such as modified starches polymerized with acrylamides.

The bentonite component employed in combination or in admixture with the polyacrylamide component is a clay, having high swelling capacity in water, and which is essentially montmorillonite. Sodium bentonite, also known as Wyoming bentonite, having high swelling capacity in water, is preferred for this purpose. However, calcium bentonite, having negligible swelling capacity, can be converted to the preferred swellable type by adding sodium carbonate. To achieve good flow characteristics in the mixture of the two components, the bentonite should be of small particle size, generally less than 50 microns, and non-gritty. Preferably, the bentonite used should have an average particle size less than about 20 microns.

Of particular significance, the bentonite component does not burn and the polyacrylamide component also is quite stable at high temperature and resists burning.

The proportions of the polyacrylamide and bentonite components incorporated into the water are sufficient to form a firm aqueous gel effective as a fire extinguisher fluid according to the invention. Such proportions can vary, but generally there can be employed about 0.3 to about 5, preferably about 0.5 to about 2, parts of polyacrylamide component, and about 2 to about 20, preferably about 2 to about 10, parts of bentonite component, per 100 parts of water, by weight. It has been found that a particularly effective fire extinguisher fluid in the form of an aqueous gel, noted herein as composition A, is provided by incorporating 0.5 part polyacrylamide and 2.7 parts bentonite, per 100 parts of water, by weight. Generally a larger proportion of bentonite than polyacrylamide, by weight, is employed, and hence the use of the bentonite also functions as an inexpensive diluent for the polyacrylamide.

It will be noted that the acrylamide and bentonite components described above, and suitable for use in the invention composition, are water absorbers. They do not dissolve in water, and hence the formation of a "gel" as referred to herein is achieved by the ability of the mixture of the above components to actually absorb substantially all of the water that is added. If excess water is used, the firmness of the gel is reduced, since the completely absorbed particles of the components are then present in the excess water vehicle.

It has been found, as previously noted, that bentonite is somewhat difficult to mix with water while eliminating the formation of lumps, and must be added to water slowly under very good agitation. Although polyacrylamide is easier to mix with water, here also agitation is usually required. It has been found that the mixture of polyacrylamide and bentonite according to the invention is substantially easier to blend into water, and form a smooth relatively uniform water mixture, which gels shortly thereafter.

Accordingly, although the polyacrylamide and bentonite components can be added separately to water to form an aqueous fire extinguisher gel according to the invention, preferably where used with a fire fighting vehicle, a mixture of the components should be stored and used as a dry powder, and mixed with water at the time of application to a burning area. For this purpose, mixing equipment should be provided having a suitable nozzle construction which will permit drawing in of the powder mixture, premixing it in proper proportions as noted above, with or in the water stream, and successfully discharging the resulting aqueous mixture. When the powder mixture is added into a water stream in this manner gel formation occurs during travel of the stream to the burning target. In this respect the use of the above noted optimum composition A comprised of 0.5 parts polyacrylamide and 2.7 parts bentonite, provides a firm gel which is rapidly formed. Thus, for example such composition A gels on the order of about 5 seconds after incorporation of the polyacrylamide and bentonite components into the water. Since the time lapse between incorporation of the polyacrylamide-bentonite mixture into a suitable fire equipment hose or nozzle, and its discharge onto a heated or burning area or surface may be less than that required to form a gel, e.g. say about 3 seconds for the above noted optimum composition A, gelation may not be complete when the aqueous mixture arrives at the target surface, so that completion of gelling will then occur a very short time after hit of the aqueous mixture stream.

However, in some instances it may be desirable to employ a premixed aqueous gel containing the polyacrylamide-bentonite gelling agent, and supplied in a container. Under these conditions the fire fighting equipment will require a pumping system embodying a nozzle suitable for intake and discharge of such permixed gel.

As an optional feature, in order to eliminate lumping in the absence of good agitation, before the polyacrylamide-bentonite mixture is incorporated into water, a dispersing agent, particularly ethyl silicate, or the material marketed as No. 131 dispersant by Nalco Chemical Co., is premixed with the powder mixture of the polyacrylamide and bentonite components. This forms a fluid slurry since swelling and gel formation does not occur until water is added to the resulting slurry. The dispersing agent can be employed in varying properties, e.g. in an amount ranging from about 40 to about 80 percent by weight of the powder mix of polyacrylamide and bentonite. If desired, for example, one or both of the above noted dispersing agents can be employed, for incorporation therein of the polyacrylamide and bentonite components in the above noted proportions. However, any liquid dispersant can be used which is miscible with water and wets the polyacrylamide and bentonite components, substantially without affecting either the water absorption properties of the components or the rate at which water is absorbed by such components when water is added to the slurry, and thus substantially without affecting their gel forming capacity in water.

The following is an example of practice of the invention.

A dry powder mixture consisting of 0.5 parts of XD1209 (Dow polyacrylamide) and 2.7 parts sodium bentonite, by weight, were incorporated into 100 parts by weight of water, and the aqueous mixture was discharged in a stream from a 1 inch diameter pipe and a 2 inch diameter pipe, respectively. The polyacrylamide and bentonite components were incorporated as a mixture into the water just prior to discharge from the hose nozzle on each of the pipes, and the aqueous mixture immediately commenced to form a gel, gelation being completed very shortly after the streams impinged on the target area. Approximate time of complete gelation was about 5 seconds total from the time of incorporation of the dry mixture of components into the water passing through the pipes, just prior to discharge from the nozzles. At a flow rate of 100 gallons per minute (GPM), the velocity of the stream through the 1 inch diameter pipe was 2392 ft/min. and through the 2 inch diameter pipe, 599 ft/min.

Table 1 below shows the amounts of the polyacrylamide and bentonite components employed at various flow rates.

TABLE 1

| Flow Rate (Vol.) | Polyacrylamide (XD 1209)(lbs.) | Bentonite (lbs.) |
|---|---|---|
| 80 GPM | 3.6 | 19.44 |
| 100 GPM | 4.17 | 22.5 |
| 120 GPM | 5 | 27 |
| 150 GPM | 6.26 | 33.8 |
| 175 GPM | 7.3 | 39.45 |
| 200 GPM | 8.35 | 45.0 |

Thus, for the above range of flow rates, a total ranging from approximately 25 to 55 lbs. per minute of the dry mixture of components is required.

An area of 1 sq. ft. can be covered with a ¼ inch thick layer of aqueous gel containing 1.33 lbs. of water, or 6.76 sq. ft. of gel per gallon of water. Thus, at the various flow rates shown in Table 2 below a gel layer ¼ inch thick can be deposited over the corresponding areas noted in Table 2.

TABLE 2

| Flow Rate | Area |
|---|---|
| 80 GPM | 540 Sq. Ft. |
| 100 GPM | 676 Sq. Ft. |
| 120 GPM | 811 Sq. Ft. |
| 150 GPM | 1014 Sq. Ft. |
| 175 GPM | 1183 Sq. Ft. |
| 200 GPM | 1352 Sq. Ft. |

An aqueous gel corresponding to the composition of this example discharged from a 1,000 gallon tank truck can pump for 10 minutes at a rate of 100 GPM of the aqueous mixture or gel, and the resulting gel discharged can cover about 6700 sq. ft. of area, and 350°F exposure, it can maintain a wet blanket over the area for about 45 minutes prior to complete evaporation of water. The evaporation rate and therefore the cooling effect when employing water alone and which is retained in the form of a thick blanket would be approximately 30 minutes under the same conditions.

It is accordingly seen that the aqueous fire extinguisher fluid or gel of the invention affords a more efficient cooling effect than water and also has the advantage of clinging to non-horizontal or vertical surfaces.

The following is another example of an efficient fire extinguisher fluid according to the invention, containing additional components.

| COMPONENTS | PARTS BY WEIGHT |
|---|---|
| Water | 100 |
| Bentonite | 5 |
| Polyacrylamide XD 1209 | 0.5 |
| Ammonium sulfate | 10 |
| Sodium bicarbonate | 7 |
| Aerosol 22 | 1.0 |

The ammonium sulfate functions as a flame retarding salt for lower burning temperature cellulosic materials such as wood, paper and fabrics, and which is nontoxic.

Sodium bicarbonate, or equivalent alkali metal bicarbonate, functions to liberate carbon dioxide gas as the liquid gets hot. It is a good gassing agent for foam generation in that it has good stability at room temperature and a pH which is slightly alkaline, yet it decomposes below the boiling point of water, to liberate a non-combustible gas.

The material marketed as Aerosol 22 is a foaming and wetting agent of the class of organic sodium sulfonates, such as the alkyl aryl sulfonates. Alternative types of wetting agents which can be employed include Aerosol OT, an aqueous dispersion of dioctyl sodium sulfosuccinate. Still other types of wetting agents which can be employed include the wetting agents marketed as the Tergitols, e.g. the alkyl phenyl ethers of polyethylene glycol such as the trimethyl nonyl ether of polyethylene glycol.

The amount of ammonium sulfate which can be employed can range from about 5 to about 20 parts; the amount of sodium bicarbonate from about 3 to about 15 parts, and the amount of wetting agent from about 0.5 to about 2 parts, per 100 parts of water, by weight.

The above fluid composition has the advantages of permitting rapid fluid flow, the ability to wet dry and super dry surfaces rather than to be repelled as water often is, the fluid penetrates porous material such as wood, the fluid foams and smothers a flame or burning area as well as imparting a cooling effect, such smothering being aided by the generation of an inert $CO_2$ gas, the areas penetrated or wetted with the fluid have a retarded reignition characteristic to reduce flare ups, and the presence of the dissolved solids in the fluid imparts a degree of reduced evaporation to the deposited wet layer of fluid, to prolong the cooling effect thereof.

From the foregoing, it is seen that the invention provides a novel and advantageous fire extinguisher fluid in the form of an aqueous gel formed simply by incorporation of polyacrylamide and bentonite into water, resulting in rapid formation of an aqueous gel which can be readily discharged from a hose to form a wet fire extinguishing blanket over a burning area.

Although the gel composition of the invention is particularly useful and effective as a fire extinguisher fluid, it can be employed in other applications to maintain any highly heated environment or surface cool. Thus, for example, the invention composition also can be used for cooling, welding soldering and sweating (plumbing) operations.

While particular embodiments of the invention have been described for purposes of illustration, it will be understood that various changes and modifications within the spirit of the invention can be made, and the invention is not to be taken as limited except by the scope of the appended claims.

What is claimed is:

1. A cooling and fire extinguisher fluid comprising an aqueous gel containing as gelling agent a combination of a polyacrylamide and bentonite in proportions effective to form a firm gel.

2. A cooling and fire extinguisher fluid as defined in claim 1, wherein said bentonite is present in greater weight proportion than said polyacrylamide.

3. A cooling and fire extinguisher fluid as defined in claim 2, wherein said polyacrylamide is present in an amount ranging from about 0.3 to about 5 parts and said bentonite is present in an amount ranging from about 2 to about 20 parts, per 100 parts of water, by weight.

4. A cooling and fire extinguisher fluid as defined in claim 2, wherein said polyacrylamide is present in an amount ranging from about 0.5 to about 2 parts and said bentonite is present in an amount ranging from about 2 to about 10 parts, per 100 parts of water, by weight.

5. A cooling and fire extinguisher fluid as defined in claim 1, said bentonite being sodium bentonite.

6. A cooling and fire extinguisher fluid as defined in claim 4, wherein said bentonite is sodium bentonite.

7. A cooling and fire extinguisher fluid as defined in claim 4, employing 0.5 parts polyacrylamide and 2.7 parts bentonite, per 100 parts of water, by weight.

8. A cooling and fire extinguisher fluid as defined in claim 1, including a dispersing agent which is miscible with water and is capable of wetting said polyacrylamide and bentonite substantially without affecting the gel forming capacity of said polyacrylamide and bentonite combination in water.

9. A cooling and fire extinguisher fluid as defined in claim 8, wherein said dispersing agent includes ethyl silicate.

10. A cooling and fire extinguisher fluid as defined in claim 4, including about 40 to about 80 percent of ethyl silicate by weight of the mixture of said polyacrylamide and bentonite.

11. A composition adapted for incorporation in water to provide an aqueous gel effective as a cooling and fire extinguisher fluid, comprising a mixture of about 0.3 to about 5 parts polyacrylamide and about 2 to about 20 parts bentonite, by weight, said bentonite being present in larger proportion than said polyacrylamide.

12. A composition as defined in claim 11, wherein said polyacrylamide is present in an amount ranging from about 0.5 to about 2 parts and said bentonite is present in an amount ranging from about 2 to about 10 parts, by weight.

13. A composition as defined in claim 12, said bentonite being sodium bentonite.

14. A composition as defined in claim 11, said composition including a dispersing agent which is miscible with water and is capable of wetting said polyacrylamide and bentonite substantially without affecting the gel forming capacity of said polyacrylamide and bentonite combination in water, said composition being in the form of a fluid slurry.

15. A composition as defined in claim 14, said dispersing agent being ethyl silicate.

16. A composition as defined in claim 12, said composition including about 40 to about 80 percent of ethyl silicate, by weight of the mixture of said polyacrylamide and said bentonite, by weight.

17. A process for extinguishing a fire which comprises applying to a burning area a wet blanket of an aqueous gel containing as gelling agent a combination of a polyacrylamide and bentonite.

18. A process as defined in claim 17, said wet blanket of aqueous gel being applied by introducing said polyacrylamide and said bentonite into a stream of water passing through a hose, and discharging the resulting aqueous mixture from the hose nozzle in a stream and impinging said stream on said burning area.

19. A process as defined in claim 17, wherein said polyacrylamide is present in an amount ranging from about 0.3 to about 5 parts and said bentonite is present in an amount ranging from about 2 to about 20 parts, per 100 parts of water, by weight.

20. A process as defined in claim 18, wherein said polyacrylamide is present in an amount ranging from about 0.5 to about 2 parts and said bentonite is present in an amount ranging from about 2 to about 10 parts, per 100 parts of water, by weight.

21. A process as defined in claim 20, employing 0.5 parts polyacrylamide and 2.7 parts bentonite, per 100 parts of water, by weight.

22. A process as defined in claim 19, said aqueous gel also containing about 40 to about 80 percent of ethyl silicate by weight of the combination of said polyacrylamide and said bentonite.

23. A process as defined in claim 18, including forming a slurry of said polyacrylamide and bentonite with a dispersing agent which is miscible with water and is capable of wetting said polyacrylamide and bentonite substantially without affecting the gel forming capacity of said polyacrylamide and bentonite combination in water, followed by introducing said slurry into said stream of water.

24. A process as defined in claim 23, wherein said dispersing agent is ethyl silicate.

25. A cooling and fire extinguisher fluid as defined in claim 1, including ammonium sulfate, alkali metal bicarbonate and a wetting agent.

26. A cooling and fire extinguisher fluid as defined in claim 3, including about 5 to about 20 parts of ammonium sulfate, about 3 to about 15 parts of sodium bicarbonate and about 0.5 to about 2 parts of a wetting agent, per 100 parts of water, by weight.

27. A cooling and fire extinguisher fluid as defined in claim 26, said wetting agent being selected from the group consisting of organic sodium sulfonates and the alkyl phenyl ethers of polyethylene glycol.

28. A cooling and fire extinguisher fluid as defined in claim 27, employing 0.5 parts polyacrylamide, 5 parts bentonite, 10 parts ammonium sulfate, 7 parts sodium bicarbonate and 1.0 part of said wetting agent, per 100 parts of water, by weight.

29. A composition as defined in claim 11, including about 5 to about 20 parts of ammonium sulfate, about 3 to about 15 parts of sodium bicarbonate and about 0.5 to about 2 parts of a wetting agent, by weight, said wetting agent selected from the group consisting of organic sodium sulfonates and the alkyl phenyl ethers of polyethylene glycol.

30. A process as defined in claim 17, said aqueous gel including ammonium sulfate, sodium bicarbonate and a wetting agent selected from the group consisting of organic sodium sulfonates and the alkyl phenyl ethers of polyethylene glycol.

* * * * *